US009158842B1

(12) United States Patent
Yagnik et al.

(10) Patent No.: US 9,158,842 B1
(45) Date of Patent: Oct. 13, 2015

(54) SOUND REPRESENTATION VIA WINNER-TAKE-ALL CODING OF AUDITORY SPECTRA

(75) Inventors: Jay Yagnik, Santa Clara, CA (US); Richard Francis Lyon, Los Altos, CA (US); Thomas Chadwick Walters, San Francisco, CA (US); Douglas Eck, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 361 days.

(21) Appl. No.: 13/616,938

(22) Filed: Sep. 14, 2012

(51) Int. Cl.
G06F 17/30 (2006.01)

(52) U.S. Cl.
CPC ...... *G06F 17/30743* (2013.01); *G06F 17/3074* (2013.01)

(58) Field of Classification Search
CPC ........................ G06F 17/30743; G06F 17/3074
See application file for complete search history.

(56) References Cited

U.S. PATENT DOCUMENTS

| 6,990,453 | B2 * | 1/2006 | Wang et al. ................... 704/270 |
| 8,290,918 | B1 * | 10/2012 | Ioffe ............................. 707/698 |
| 8,549,022 | B1 * | 10/2013 | Kaminski, Jr. ................ 707/758 |
| 2003/0021441 | A1 * | 1/2003 | Levy et al. .................... 382/100 |
| 2003/0086341 | A1 * | 5/2003 | Wells et al. ................ 369/13.56 |
| 2004/0028281 | A1 * | 2/2004 | Cheng et al. .................. 382/232 |
| 2007/0112565 | A1 * | 5/2007 | Kim et al. ...................... 704/229 |
| 2007/0124756 | A1 * | 5/2007 | Covell et al. ..................... 725/18 |
| 2010/0257129 | A1 * | 10/2010 | Lyon et al. ....................... 706/12 |
| 2011/0113037 | A1 * | 5/2011 | Wessling et al. .............. 707/747 |
| 2011/0173185 | A1 * | 7/2011 | Vogel ............................ 707/722 |
| 2011/0173208 | A1 * | 7/2011 | Vogel ............................ 707/746 |
| 2011/0307085 | A1 * | 12/2011 | Selby et al. ..................... 700/94 |
| 2011/0314995 | A1 * | 12/2011 | Lyon et al. ..................... 84/609 |
| 2012/0123831 | A1 * | 5/2012 | King et al. ................... 705/14.7 |
| 2012/0124638 | A1 * | 5/2012 | King et al. ........................ 726/1 |
| 2012/0209612 | A1 * | 8/2012 | Bilobrov ....................... 704/270 |

OTHER PUBLICATIONS

Foote et al., "Content-Based Retrieval of Music and Audio", Multimedia Storage and Archiving Systems II, Proc. of SPIE, 1997.*
Yagnik et al., "The Power of Comparative Reasoning", Proceeding ICCV '11 Proceedings of the 2011 International Conference on Computer Vision, 2011.*

* cited by examiner

*Primary Examiner* — Samuel G Neway
(74) *Attorney, Agent, or Firm* — Morris & Kamlay LLP

(57) ABSTRACT

Sound representations and winner-take-all codes of auditory spectra are used in the identification of audio content. A transformation component converts a set of sound frames from audio content into a set of spectral slices. A spectral encoder component encodes the spectral slices of auditory spectra into winner-take-all codes with a winner-take-all hash function. An identification component identifies which spectral dimension of a subset of spectral dimensions within a spectral slice has highest spectral value according to the winner-take-all codes. Reference audio content is determined to be similar or matching to the audio content based on the winner-take-all codes.

16 Claims, 11 Drawing Sheets

SOUND REPRESENTATION VIA WINNER-TAKE-ALL CODING OF AUDITORY SPECTRA

CROSS-REFERENCE TO RELATED APPLICATIONS

The subject patent application is related to co-pending U.S. patent application Ser. No. 13/415,704, filed on Mar. 8, 2012, entitled "AUDIO IDENTIFICATION USING ORDINAL TRANSFORMATION," the entirety of which is incorporated herein by reference.

TECHNICAL FIELD

This disclosure relates generally to representing sound and in particular to generating a winner-take-all coding of auditory spectra for sound representation.

BACKGROUND

Internet media sharing enables users to share media content virtually anywhere at any time using a media capable device with an internet connection. Electronic media libraries may contain very large volumes (e.g., millions of video and/or audio files), in which the task of managing respective volumes presents unique challenges. For example, identifying audio content (e.g., songs, speeches, etc.) from among the volumes of media content is a task often required of media host services in order to recognize copyrighted uploads of music and police appropriate licensing or removal of the copyrighted material.

Audio recognition enables media hosting services to index media files for searching of desired media content. Users can thus quickly identify audio files having particular audio content. For example, a user may seek examples of particular sounds for inclusion in an audio project such as a home movie, audio recording, etc. Audio content such as sounds, audio portions, sound bites, songs, and the like can be tagged with textual labels. However conventional information retrieval of audio content using textual queries can be inaccurate. Moreover, audio content that has undergone transformation such as by being slowed, dubbed, voice overlaid, edited, recorded with a different performer than an original known performer can be difficult to identify by conventional audio recognition systems, and consequently hampering matching of media content for retrieval.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

According to an aspect of the subject innovation, systems and methods for audio identification using sound representations via winner-take-all coding are disclosed. In one embodiment, a recognition component receives a sample audio file. The sample audio file can include, for example, a cover song and/or other audio content. An auditory transformation component generates a set of spectral slices from a set of sound frames of audio content. An encoder component encodes the spectral slices into winner-take-all codes with a winner-take-all hash function. An identification component identifies which spectral dimension of a subset of spectral dimensions within at least one spectral slice has a highest spectral value according to the winner-take-all codes. Additionally, a hashing component employs a hash function to generate a fingerprint of the sample audio file using a set of spectral slices. The fingerprint includes a set of winner-take-all (WTA) codes corresponding to respective spectral slices of auditory spectra, and is invariant to variations in key, instrumentation, encoding formats, performers, performance conditions, arrangement, and/or recording and processing variations.

In an embodiment, a vector component computes a set of vectors using auditory feature values included in a sample audio file, a hash component employs a WTA hash function to generate sub-fingerprints corresponding to respective vectors in the set of vectors, and an identification component determines whether there are zero or more reference audio files similar to the sample audio file using WTA codes, and identifies the similar reference audio files.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
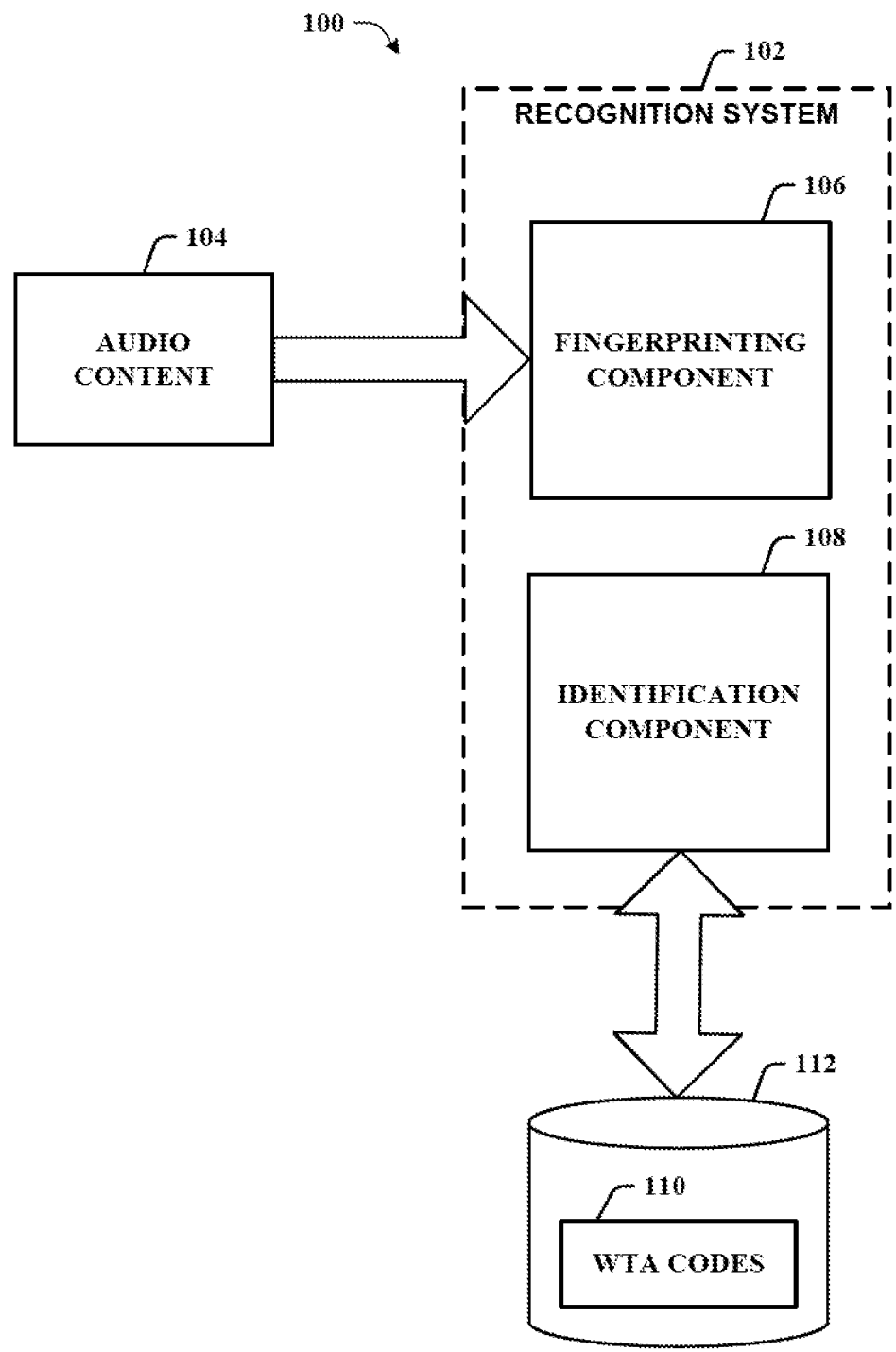
FIG. 1 illustrates an example system for audio identification using ordinal transformations in accordance with various aspects described in this disclosure.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

As noted above, techniques for media content matching that extract features from the media content with fixed reference frames often experience performance degradation when media content is subject to transformations and/or performance variations. As a consequence, matching media, using such techniques, that has been subject to transformations and/or performance variations can be difficult and computationally expensive.

In accordance with an embodiment an auditory transformation component converts sound frames into feature vectors, such as spectral slices. An encoder encodes the spectral slices with winner-take-all codes generated from a winner-take-all algorithm. The winner-take-all codes identify which spectral dimension within a group of a set of groups of spectral dimension has a highest spectral value in order to identify audio content that is similar to and/or matches a set of reference audio content.

Non-Limiting Examples of Systems for Sound Representation Via Winner-Take-All Coding of Auditory Spectra Referring initially to FIG. 1, illustrated is an example system that analyzes and encodes audio frames with a winner-take-all algorithm in accordance with various aspects described in this disclosure. Generally, system 100 can include a memory that stores computer executable components and a processor that executes computer executable components stored in the memory, examples of which can be found with reference to additional figures disclosed herein. System 100 includes a recognition system 102 that converts sound frames into spectral slices of audio content (e.g., an audio file, recording, etc.).

The recognition system 102 recognizes, identifies, or otherwise determines an identity sample audio content 104 by comparing the audio content 104, or a portion of the audio content 104, with known audio content (e.g., reference audio files), or a portion of known audio content that is similar to the audio content 104, such as audio content stored in a data store 112 and/or other data storage. The audio content 104 can include an audio file encoded in any suitable type of audio codec (e.g., AAC, HE-AAC, MP3, FLAC, ALAC, OGG, WMA, and so forth), and can be an entire audio file (e.g., a recording of a complete musical performance) or a portion thereof.

Additionally or alternatively, the input audio content 104 can include the audio portion of a video file (or a portion of a video file). The audio content 104 can include audio data, such as, songs, speeches, soundtracks and/or any other suitable audio content. For example, in an implementation, the audio content 104 can include a video performance of a cover song uploaded to a media hosting service by a user, and the recognition system 102 can identify the cover song by determining a set of reference songs (or known songs) that are similar to the cover song. Cover songs can include, for example, but are not limited to performances of a reference song that feature different performers, instrumentation, performance conditions, and/or arrangements from the reference song. For example, a cover song can include a live performance of a recorded reference song featuring the original performer of the recorded reference song. As an additional or alternative example, a cover song can include a performance of a reference song by a performer other than the original performer.

The recognition system 102 includes a fingerprinting component 106 and an identification component 108, which are operatively coupled to the data store 112. The fingerprinting component 106, for example, determines, provides, or otherwise generates an identifier or fingerprint using auditory features included in the audio content 104. The identifier or fingerprint, for example, can be an identifier based on a winner-take-all code generated from a spectral slice of a set of audio content, in which the term "set" is used herein as "one or more". For example, in one implementation, the audio features include melodic characteristics of the audio file 104. The fingerprint is invariant, or sufficiently invariant, to variations in key, instrumentation, encoding formats, performers, performance conditions, arrangement, and/or recording and processing variations.

The identification component 108 determines whether there is any number of reference audio content similar to the sample audio content 104, and recognizes, categorizes, or otherwise identifies the reference audio files that are similar to the audio file 104 using the identifier/fingerprint generated by the fingerprinting component 106, as detailed further with examples infra. For example, in one implementation, the identification component 108 compares the fingerprint, or a portion of the fingerprint, for the audio file 104 against a set of fingerprints 110 (or identifiers) for reference audio files, and determines a set of reference audio files that are similar to the audio file 104 (or portion of the audio file) based at least in part on a set of similarity criteria. The similarity criteria can include, but are not limited to satisfying a predetermined similarity threshold.

As an additional or alternative example, in one implementation, the identification component 108 can employ the fingerprint to lookup reference audio files that are similar to the audio file 104. For instance, the fingerprint can include a set of hash values, and the identification component 108 can employ the set of hash values to lookup a fingerprint in the set of winner-take-all (WTA) codes 110 for a reference audio file, e.g., using a hash table. It is to be appreciated that although the set of WTA codes 110 are illustrated as being maintained in the data store 112, such implementation is not so limited. For instance, the set of fingerprints 110 can be maintained in another location, and the identification component 108 may access the set of fingerprints 110, for example, via a network connection.

Figure 2:
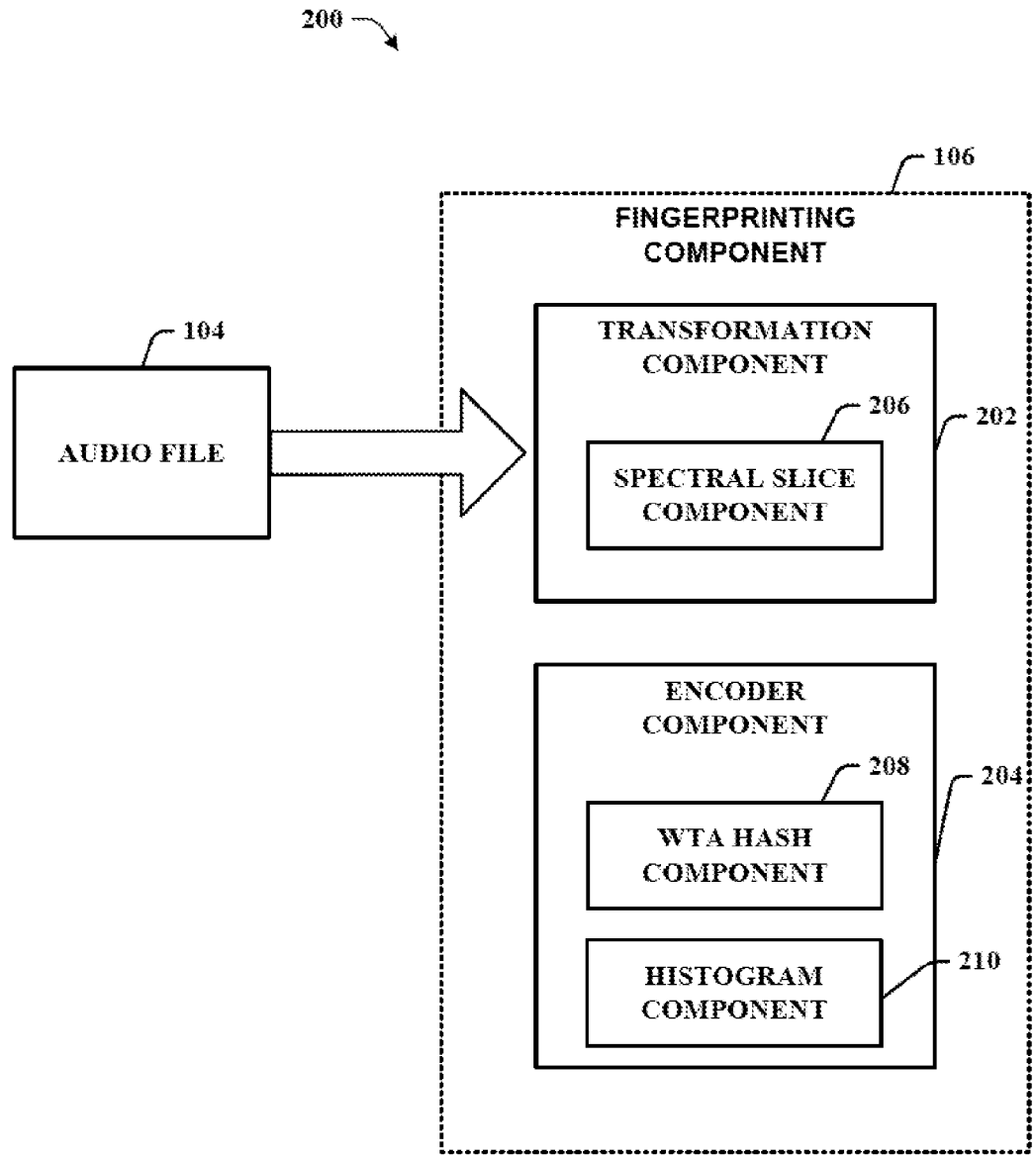
FIG. 2 illustrates an example fingerprinting component in accordance with various aspects described in this disclosure.

FIG. 2 illustrates an example fingerprinting component 106 in accordance with various aspects described in this disclosure. As discussed, the fingerprinting component 106 generates an identifier or fingerprint using auditory features included in the audio file 104. The fingerprinting component 106 in FIG. 2 includes a transformation component 202, such as an auditory transformation component, and an encoder component 204, such as a spectral encoder component.

The auditory transformation component 202 generates representations of auditory spectra for the audio content 104, such as according to a time period. For example, a spectral slice is generated that represents a window or time period of at least one audio content portion. A spectral slice, for example, can represent about 20 seconds of the audio content (e.g., a song, speech, or any other similar audio content) received as input and/or any predetermined time period or window. The spectral slices can be generated by analyzing steps along a continuous sound waveform (e.g., 50 millisecond long waveform segments with a window stepping every 20 milliseconds, and/or other envisioned time frames), in which each waveform segment can be transformed into a spectrum that is a spectral slice. The continuous sound wave of the audio content is generated into spectral slices by a transform, such as a forwarding transform of the magnitude spectra and/or a similar transform that generates spectral slices for auditory representation. Additionally, each spectral slice can correspond to a vector at a particular time. For example, the spectral slices can be lined up in a vertical column to form a mapped depiction of spectral slices called a spectrogram, sonogram and/or the like, which is a short time spectral segment of the continuous sound waveform illustrating how the waveform segment changes.

The transformation component 202 includes a spectral slice component 206, in one embodiment, that calculates a spectral slice as a part of a Mel-Frequency Cepstrum (MFC), which is a representation of a short-term power spectrum of sound that is based on a linear cosine transform of a log power spectrum on a nonlinear Mel scale of frequency. The spectral slice component 206 further operates to output the spectral slices by computing a transform on a window or waveform segment of the audio content 104 (e.g., a continuous audio signal content) and mapping characteristics (e.g., powers) of the spectrum obtained from the transform onto a mel scale, such as by using triangular overlapping windows and the like. The mel scale (mel-frequency cepstrum) comprises equally spaced frequency bands, however, cepstrum scale could also be mapped to the spectral slices. The spectral slices can be generated in other different ways and could include and/or be a stabilized auditory image (SAI), or an intervalgram.

In one example, the transformation component 202 can determine an SAI that includes a sequence of frames or a sequence of the vertical slices discussed herein having a fixed time period between each frame or each slice. The SAI represents the inputted audio content 104 using a model designed to simulate how the human auditory system processes and represents sound. Humans perceive events by receiving information in the form of light and sound waves. Just as the human visual system forms a visual image of the visual aspects of the event, the human auditory system forms an "auditory image" of the auditory aspects of the event. In another example, the transformation component 202 can divide a musical octave at a time interval (current time interval) into a set of bins (e.g., 32 bins). Each of the bins corresponds, for example, to a range of musical pitch or frequencies (e.g., 1/32 of an octave). The vector component 202 computes a strength of each of the musical pitches (e.g., 32 musical pitches) during the current time interval, and creates an intervalgram by comparing the pitch vector at the current time interval with pitch vectors at a set of time intervals immediately preceding the current time interval and a set of pitch intervals immediately succeeding the current time interval.

The spectral encoder component 204 determines, calculates or otherwise encodes spectral slices into identifiers or fingerprints that include a set of WTA codes. The WTA codes can be used to lookup reference audio files in a set of hash tables that are similar, or identical, to the audio file 104. For example, in one implementation, the WTA codes include a set of hash values corresponding to a respective spectral slice generated by the transformation component 202. The spectral encoder component 204 can employ various hash functions in connection with computing the hash values including but not limited to hashing based on random projections, weighted min-wise independent permutations, locality sensitive hashing (MinHash), and/or winner-takes-all hashing.

For example, the hashing component 204 includes a WTA hash component 208 that transforms an input feature space (e.g., vectors) into binary codes (e.g., hash values) such that a Hamming distance, or Hamming similarity, in a resulting space (e.g., binary codes or hash values) that correlates with rank similarity measures. The WTA hash component 208 can permutate the vectors (e.g., spectral slices), analyze a first subset of the elements in the respective permutated vectors, and generate the set of hash values (or WTA codes) by coding an index of a maximum element in the respective first subset of elements for the permutated vector (e.g., a K-sized subset of feature dimensions, where K is an integer). For example, in one embodiment, the WTA hash component 208 applies the WTA hash function to each spectral slice X times, where X is an integer (e.g., 200). For each application of the WTA hash function, the WTA hash component 208 uses a different permutation (e.g., 6) included in a set of permutations, and produces a four bit hash, for example, for each permutation, resulting in a WTA code having Y bits (or Y divided by eight bytes), where Y equals X multiplied by four. For instance, where X is 200, the sub-fingerprint has 800 bits (200*4) or 100 bytes (800/8). For each spectral slice, the WTA hash component 208 employs the same set of permutations (e.g., 200) to generate the sub-fingerprints.

In one example implementation, the WTA hash component 208 generates a 4-bit hash as follows. The WTA hash component 208 selects 16 items from a 1024-dimensional input vector, e.g., using a pseudo-random process with a fixed random number seed. The WTA hash component 208 identifies the index of the largest selected item, which will be a number from 0 to 15, and encodes this index using 4-bits, to yield one hash. The WTA hash component 208 can repeat the process using a total of 200 different random number seeds. In one implementation, to reduce entropy of the resulting hash codes, and increase the frequency of matching, 15 items are selected rather than 16. The WTA hash component 208 encodes the index, which in such implementation is a number from 0 to 14, also using 4 bits.

In addition, the fingerprinting component 106 includes a histogram component 210 that can generate a fingerprint identifier for the audio content 104 by combining the WTA codes (or hash values) corresponding respectively to different spectral slices for the audio content 104 into a histogram and/or a graphical representation illustrating the distribution of auditory data represented by the spectral slices. The size, dimension or length of the fingerprint can be based on the length of the audio file 104 (e.g., number of WTA codes for the audio file 104). The histogram can be employed by systems to filter, classify and/or generate audio content and/or portions of audio content, such as by various categories (e.g., extreme sports, skateboarding, etc.) as well as quality control filters, for example.

Some embodiments of the presently disclosed recognition system components described herein are built upon a system having a set of winner-take-all processes or algorithm for identifying audio content such as a cover song or other such audio file. Described herein are further details of the system, which has been disclosed in U.S. patent application Ser. No. 13/415,704, and is incorporated herein by reference in its entirety. Some portions have been reproduced below to provide detailed support in the present disclosure.

Figure 3:
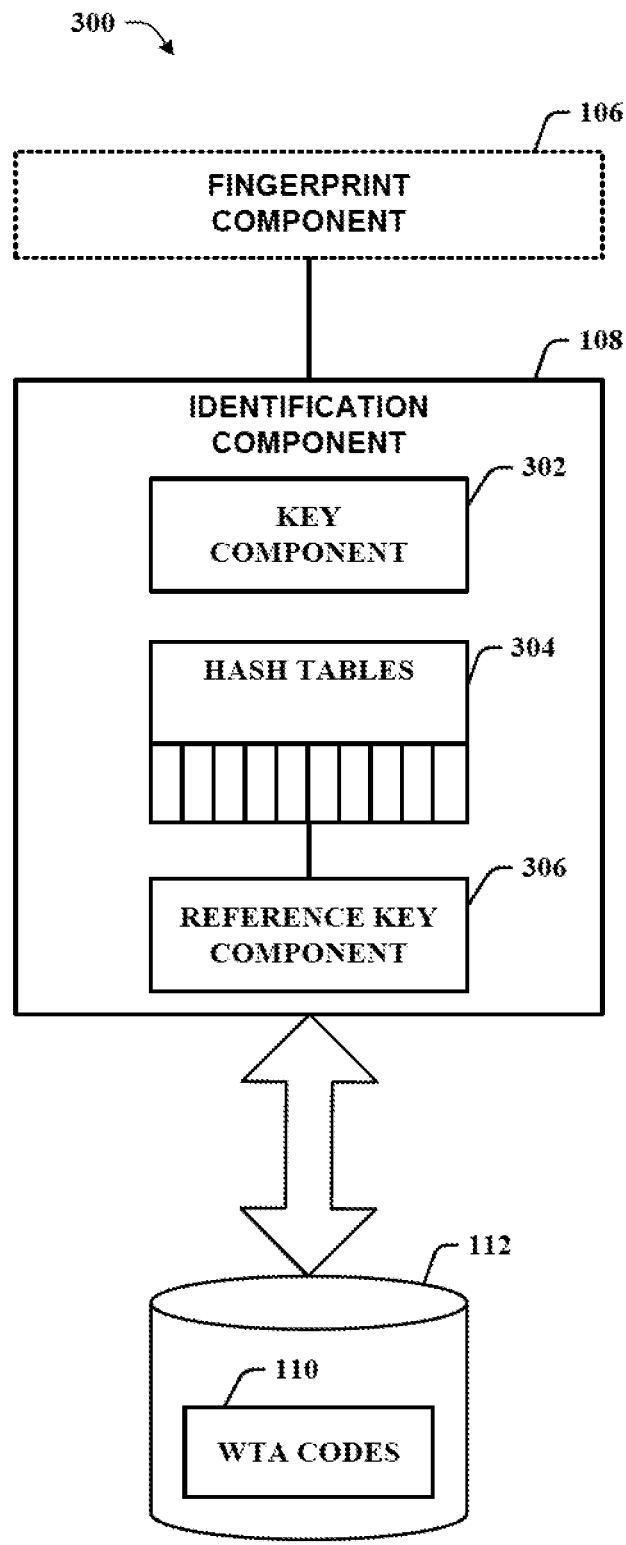
FIG. 3 illustrates an example identification component in accordance with various aspects described in this disclosure.

Referring to FIG. 3, illustrated is an example identification component 108 in accordance with various aspects described in this disclosure. The identification component 108 determines whether reference audio content are similar to a sample audio content, and identifies the similar reference audio content files using the WTA codes of spectral slices generated by the fingerprinting component 106. The identification component 108 in FIG. 3 includes a key component 302, a set of hash tables 304, and a reference key component 306. The key component 302 generates a set of keys using a WTA codes generated by the fingerprint component 106. For example, in one implementation, the key component 302 separates, partitions, or otherwise divides the WTA codes into a set of index keys based on a set of key generation criteria. The key generation criteria can include but is not limited to a predetermined quantity of keys or a predetermined key size. For example, the key component 302 can divide a 100-byte sub-fingerprint into a set of 25 four-byte keys (or chunks).

Reference songs and/or other audio content are represented by a fingerprint included in the set of WTA codes 110 (e.g., unique identifier). The reference key component 306 generates a set of reference keys for a reference song using the set of WTA codes 110, and inserts the reference keys into corresponding hash table bins in the set of hash tables 304. For example, if a first reference song has a key value K for a first hash table, then the first reference song is inserted in bin K in the first hash table. If the first reference song has a key value C for a second hash table, then first reference song is inserted into bin C in the second hash table. The quantity of bins in a hash table in the set of hash tables 304 is equal to a range of possible values of a key. For instance, for a 32-bit key, there can be 2^32 bins.

The identification component 108 indexes respective keys generated by the key component 302 into each of the hash tables included in the set of hash tables 304. For example, a first key (or chunk) can be used to index each of the hash tables 304, a second key (or chunk) can be used to index each of the hash tables 304, and so forth (discussed in greater detail with reference to FIG. 4).

In one example, a locality sensitive hashing (LSH) indexing process can be used to index the WTA codes. In LSH indexing, a set of index keys can each correspond to a different unique fixed-length byte sequence (e.g., 4 bytes). For each unique byte sequence, the LSH index can store pointers to each of the reference fingerprints that contain that particular byte sequence. Thus, for example, if reference fingerprints A, D, and X each include the 4-byte sequence {A5 B1 43 67}, the LSH index stores pointers to reference audio clips A, D, X in association with the index key {A5 B1 43 67}. The LSH index can be queried by inputting an index key, and the index returns pointers to each reference audio clip containing that particular index key. LSH indexing is just one example of an indexing scheme for indexing the reference fingerprints in the reference database 112. In alternative embodiments, the identification component 108 can index reference audio content based on fingerprints or WTA codes of spectral slices according to a different indexing scheme. In one embodiment, the identification component 108 stores the reference audio content in the reference database 112 in their native form without applying any data-reduced indexing.

As an additional or alternative example, in one implementation, each key (or chunk) is used to index a different hash table, e.g., a first chunk indexes table 0, a second chunk indexes table 1, and so forth. As an example, in one implementation, a fingerprint consists of 100 bytes: [b0, b1, b2, b3, b4, ... b99]. A key for a first hash table (hash table #0) is made from the first four bytes—key0: [b0, b1, b2, b3]; a key for a second hash table (hash table #1) is made from the second four bytes—key1: [b4, b5, b6, b7]; and so forth such that a key for a twenty-fifth hash table (hash table #24) is key24: [b96, b97, b98, b99]. Accordingly, each bin in hash table #0 will contain a list of song identifiers, indicating reference songs that have at least one fingerprint that have exactly the same first four bytes, and similarly for each of the 25 hash tables.

The identification component 108 determines whether one or more reference audio content or files are similar to the sample audio content 104 based on a set of similarity criteria, and identifies the similar reference audio files. The similarity criteria can include but is not limited to satisfying a similarity threshold, wherein the similarity threshold is a predetermined quantity of keys corresponding to a reference song. For example, the identification component 108 can determine reference songs that are similar to the audio file 104, where the audio file 104 has at least X keys corresponding to the respective reference songs (X is an integer) in the set of hash tables 304. For example, for each hash table key of an audio file 104, the identification component 108 can retrieve a list of reference hash table keys from the corresponding hash tables. Each key in the result set indicates that the audio file sub-fingerprint and the reference sub-fingerprint match in at least four bytes. To enforce a higher matching threshold, in one implementation, reference keys that appear in less than four of the hash bins (i.e. match in less than 16 bytes of the 100-byte sub-fingerprint) can be discarded. Accordingly, for each WTA code of the audio file 104, the identification component 108 determines a list of reference songs with approximately matching sub-fingerprints.

Figure 4:
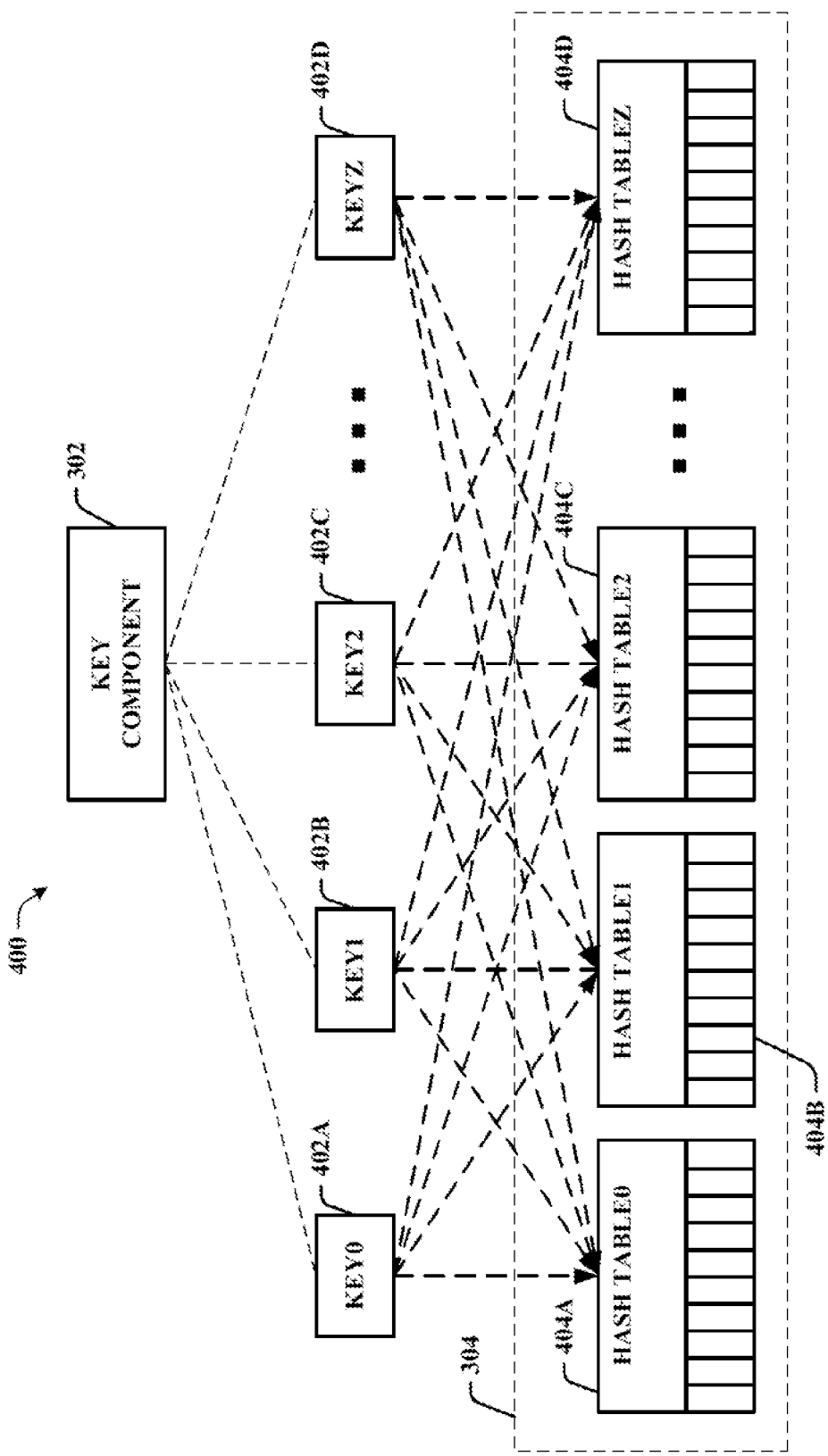
FIG. 4 illustrates a system that provides a non-limiting example of audio identification using ordinal transformations in accordance with various aspects described in this disclosure.

FIG. 4 illustrates a system 400 that provides a non-limiting example of audio identification using sound representations from WTA codes of auditory spectra in accordance with various aspects described in this disclosure. The system 400 includes a key component 302 and a set of hash tables 304. As discussed, the key component 302 generates a set of index keys 402 (e.g., 402A-402D) using WTA codes from a fingerprint component 106, in which the WTA codes encode spectral slices of an auditory spectrum for audio content received. For example, in one implementation, the key component 302 divides the WTA codes into the set of keys 402 based on a set of key generation criteria, including but not limited to a predetermined quantity of keys or a predetermined key size. For example, in one implementation, the key component 302 divides sub-fingerprint (e.g., WTA codes) into a set of Z keys, where Z is an integer. For instance, the key component 302 can divide a 100-byte sub-fingerprint into a set of 25 four-byte keys.

The keys 402 are indexed into hash tables 404 (e.g., hash tables 404A-404D) in the set of hash tables 304. In one embodiment, WTA codes can be concatenated or further combined to generate index keys. The audio file 104 is determined as being similar to one or more reference songs, if any, based on a set of similarity criteria. The similarity criteria can include but is not limited to satisfying a similarity threshold. For example, the similarity threshold can include a predetermined quantity of keys corresponding to a reference song. For example, in one implementation, the identification component 108 can determine a reference song is similar to the audio file 104 based on the audio file 104 having at least X keys corresponding to the reference song (X is an integer) in the hash tables 404 (e.g., hash tables 404A-404D).

Additionally or alternatively, the similarity criteria can include having a quantity of N WTA codes that match a reference song, where a WTA code matches a reference song if a set of M consecutive keys match, where N and M are integers. For instance, N can be a quantity of WTA codes corresponding to a thirty-second interval of the audio file 104, or can represent one or more sets of WTA codes concatenated together.

Figure 5:
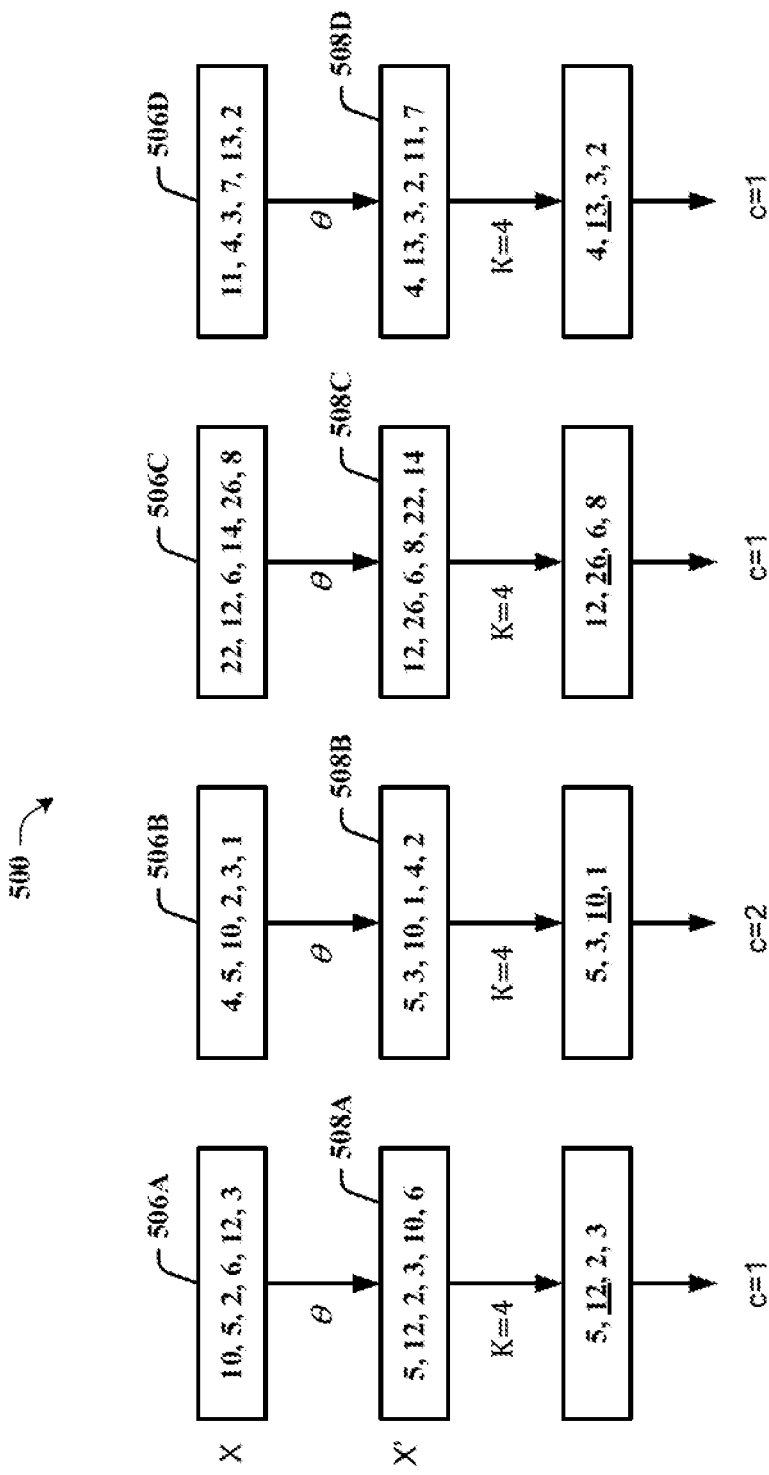
FIG. 5 illustrates an example of winner-takes-all (WTA) hashing in accordance with various aspects described in this disclosure.

FIG. 5 illustrates an example of WTA hashing 500 in accordance with various aspects described in this disclosure. As discussed above, the WTA hash component 208 transforms an input feature space into binary codes such that a Hamming distance in a resulting space correlates with rank similarity measures. Rank similarity measures provide stability to perturbations in numeric values, and provide good indications of inherent similarity, or agreement, between items or vectors being considered. A non-limiting example WTA hashing algorithm, as employed by the WTA hash component 208, is detailed by Algorithm 1, shown below:

(Algorithm 1)
WTA Hash

Input: A set of m Permutations Θ, window size K, input vector X.
Output: Sparse vector of codes $C_X$.
  1. For each permutation $\theta_i$ in Θ.
    (a) Permutate elements of X according to θ, to get X'.
    (b) Initialize $i^{th}$ sparse code $c_{xi}$ to 0.
    (c) Set $c_{xi}$ to the index of maximum value in X' (1...K)
      i. For j = 0 to K − 1
        A. If X'(j) > X' ($c_{xi}$) then $c_{xi}$ = j.
  2. $C_X$ = [$c_{x0}, c_{x1}, \ldots, c_{xm-1}$], C contains m codes, each taking a value between 0 and K − 1.

Algorithm 1 provides a feature space transformation having a resulting space that is not sensitive to the absolute values of the feature dimensions (e.g., frequencies, and/or other auditory features), but rather on the implicit ordering defined by those values. In effect, the similarity between two points is defined by the degree to which their feature dimension rankings agree. A pair-wise order measure can be defined according to Equation 1 below:

$$PO(X, Y) = \sum_i \sum_{j<i} T((x_i - x_j)(y_i - y_j)) \quad \text{(Equation 1)}$$

where $x_i$ and $y_i$ are the $i^{th}$ feature dimensions in X, Y $R^n$ and T is a threshold function, $$T(x) = \begin{cases} 1 & x > 0 \\ 0 & x \leq 0 \end{cases}.$$

Equation 1 measures the number of pairs of feature dimensions in X and Y that agree in ordering. By regrouping the pair-wise summations with respect to ranks, then the pair-wise order function PO can be rewritten in the following form:

$$PO(X, Y) = \sum_i R_i(X, Y) \quad \text{(Equation 2)}$$

where $$R_i(X,Y) = |L(X,i) \cap L(Y,i)| \quad \text{(Equation 3)}$$

$$L(X,i) = \{j | X(i) > X(j)\} \quad \text{(Equation 4)}$$

Equation 2 groups pair-wise agreement terms by one of the indices in the pair. $R_i(X, Y)$, in Equation 3, measures the ranking agreement for index i with indices that rank below i. Indices of elements in X that are ranked below index I are denoted with L(X, i), in Equation 4. The rank agreement at index i is the cardinality of the intersection of the corresponding L sets from X and Y. For example, to compute PO(X, Y) between a first input vector 506A and a second input vector 506B in the WTA hash 500, the term $R_0(X, Y)$ will measure the size of the intersection for the set of indices smaller than index 0. L(X, 0)=[1, 2, 3, 5] are the set of indices in the first input vector 506A that have values smaller than that at index 0, similarly for Y, L(Y, 0)=[3, 4, 5] which gives L (X, i)∩L(Y, i)=[3, 5] leading to $R_0(X, Y)$=2. Equation 2 rearranges the unique pair-wise summations into intersections of these "less than" lists. The inner summation instead of covering all j<i, now covers all j such that X(j)<X(i), and the result is the same since in both cases the unique pairs (i, j) are covered.

Algorithm 1 outlines a transformation method where the permutations in the algorithm are generated randomly and stored for use by all data points. For example, the key component 302 can identify subsets of spectral dimensions of the at least one spectral slices based on a random function. The transformation method depends on coding multiple partial orderings of a data point as a way to lower bound ranking agreement in case of a similarity or a match. Essentially, K dimensions are selected from the sample, and the dimension with the highest value in the subset of size K is coded. For example, K can be selected at random and consistent across all samples which give rise to the notion of permutations.

Equality in the codes $c_i$ implies that the estimate of Equation 1 can or possibly should be increased by K−1. If two vectors X and Y have the same value for output code $c_0$, for example, $c_0$=a, for a window size of K, then X and Y match in K−1 inequalities that state X'(a)>X'(i) and Y'(a)>Y'(i) for all i: 0≤i<K, i≠a. So T(($x'_a-x'_i$)($y'_a-y'_i$))=1 for all i: 0≤i<K, i≠a which results in a progressively lower bound on a pair-wise order agreement (e.g., Equation 1) between X and Y as more codes match. This is colloquially referred to as a winner takes all (WTA) hash function, because only the "winner" is being encoded in each subset according to a predetermined criterion (e.g., maximum value). It is to be appreciated that although Algorithm 1 is described with reference to the "winner" being a maximum value, such implementation is not limited. For instance, the "winner" can be an additional or alternative encoding of multiple points based on a partial ordering.

The example WTA hashing 500 includes four six dimensional input vectors (506A-506D), where K=4, θ=(1, 4, 2, 5, 0, 3). The first input vector 506A and the second input vector 506B are unrelated and result in different output codes (e.g., 1 and 2, respectively). The input third vector 506C is a scaled and offset version of the first input vector 506A (in this case, times 2, then plus 2), and results in the same output code as 506A (e.g., 1). The fourth input vector 506D is a version of the first input vector 506A, wherein each element has been perturbed by 1 (in this case, +1, −1, +1, +1, +1, −1). The elements of the fourth input vector 506D are ranked differently from the first input vector, but the index of the maximum element of the first K (e.g., 4) elements in the fourth input vector 506D (e.g., 1) is the same as the index of the maximum element of the first K (e.g., 4) elements in the first input vector 506A (e.g., 1).

The vectors 506A and 506C satisfy three inequalities, namely X'(1)>X'(0), X'(1)>X'(2), and X'(1)>X'(3). When computing pair-wise order agreement between the vectors 506A and 506C (e.g., Equation 1), these three terms (e.g., inequalities) will add positive contribution. This implies that equality in code $c_i$ adds K−1 to an estimate of PO in Equation 1, effectively acting as a lower bound. If a large number of codes are generated, then the bound becomes tighter as more possible pair combinations are considered.

Furthermore, it can be appreciated that the choice of K leads to different emphasis on pair-wise agreements for indices at the head of the list. For example, consider the degenerate case in which K=n, where n is the dimensionality of the feature vector. Every permutation encodes the global max element, so n−1 inequalities that relate the max element to all the others would be captured. (In general each permutation encodes K−1 inequalities relating to the max within the first K elements of that permutation.) Therefore, K=n puts complete emphasis on the head of the list. In comparison, K=2 does not put bias on the head as all pairs are encoded. Values of K between 2 and n lead to a progressively steeper bias to the head elements.

Figure 6:
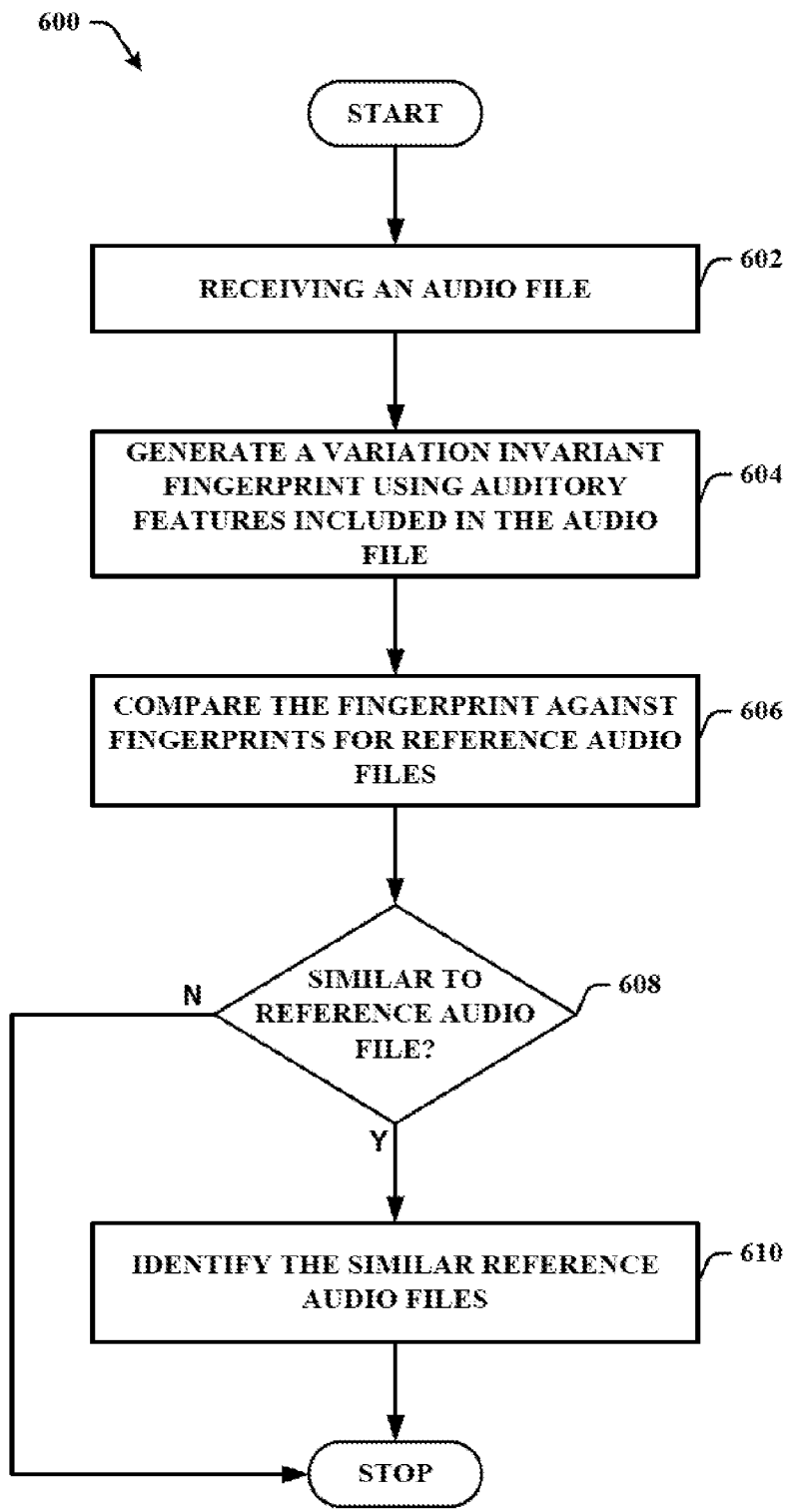
FIGS. 6-9 are example flow diagrams of respective methods for sound representation via winner-take-all coding in accordance with various aspects described herein.
Figure 7:
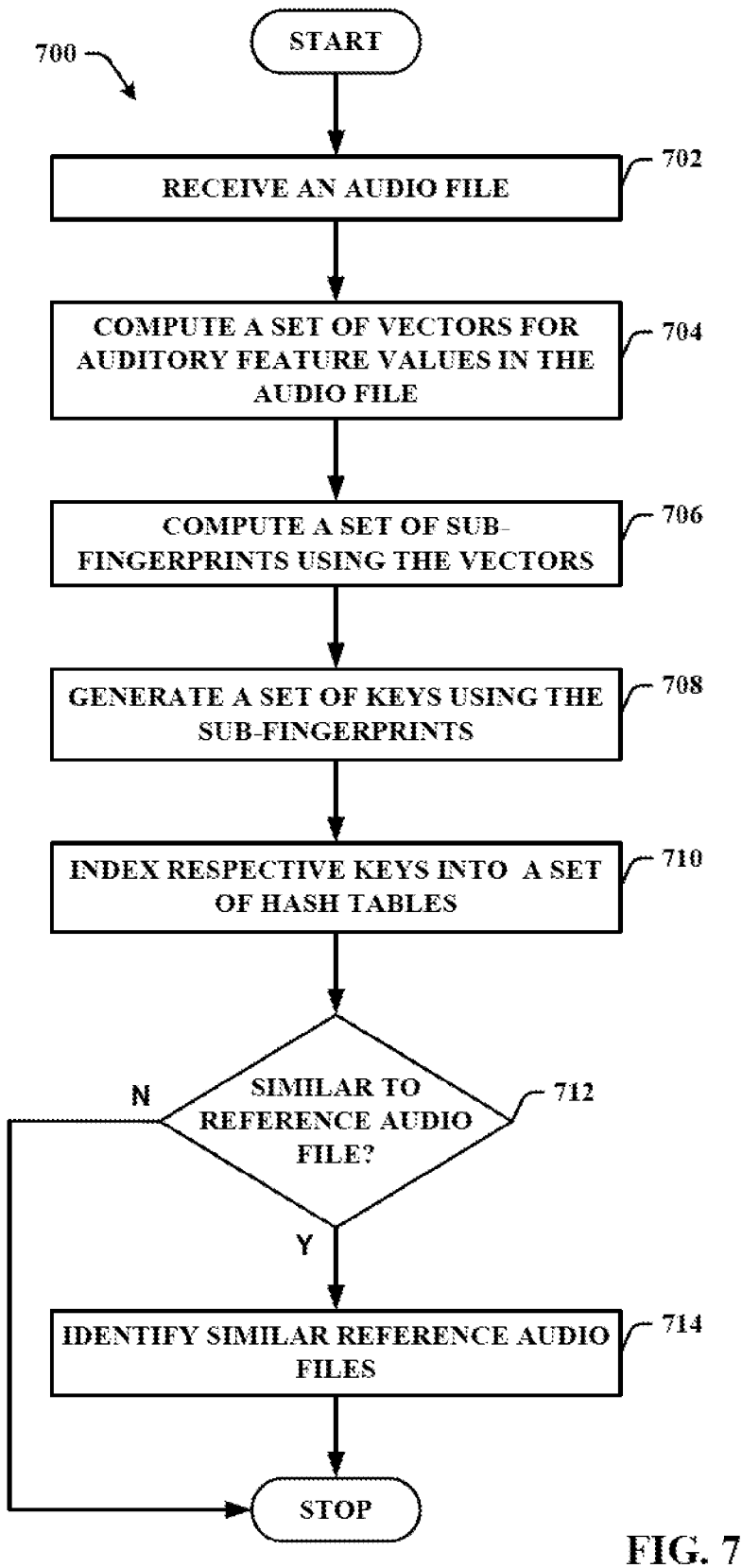
Figure 8:
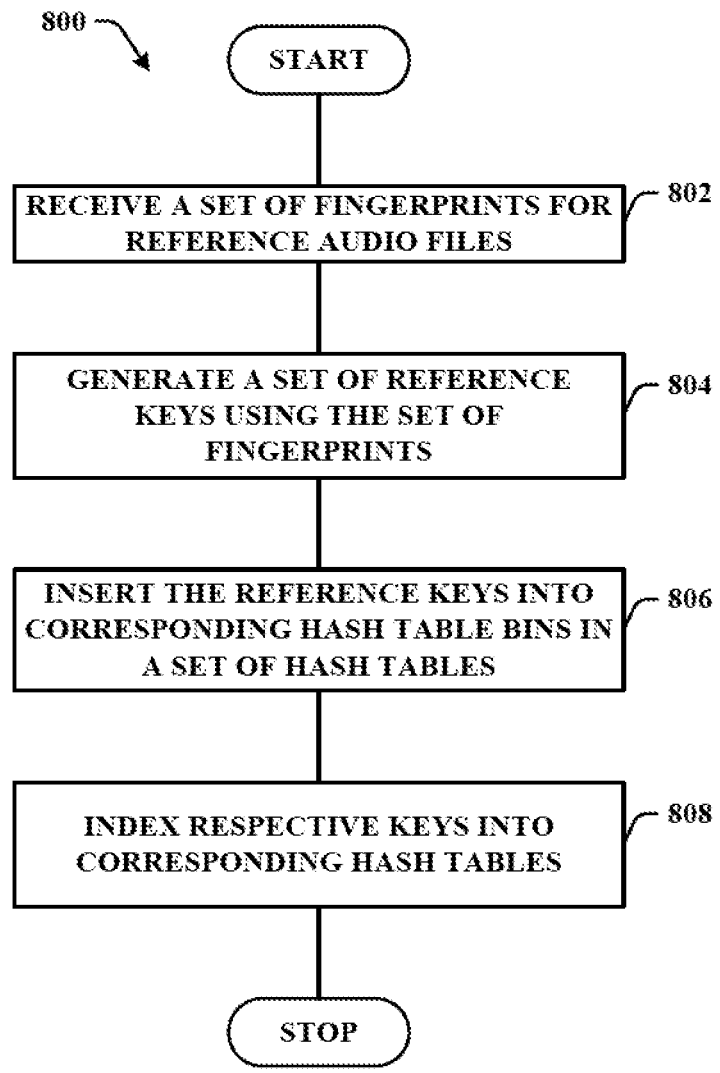

Non-Limiting Examples of Methods for Audio Identification Using Ordinal Transformations FIGS. 6-8 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 6, illustrated is an example methodology 600 for audio identification using ordinal transformations in accordance with various aspects described in this disclosure. At reference numeral 602, an audio file is obtained, acquired, or otherwise received (e.g., using the media matching component 102). The audio file can include audio data, such as, songs, speeches, and/or soundtracks. For example, the audio file can include a cover song. Cover songs include but are not limited to performance variations of a reference song that includes different performers, instrumentation, performance conditions, and/or arrangements from the reference song.

At reference numeral 604, a fingerprint (e.g., a set of sub-fingerprints) of the audio file is generated using auditory features included in the audio file (e.g., using the fingerprinting component 106). For example, in one implementation, the auditory features include melodic characteristics of the audio file. The fingerprint is invariant or effectively invariant to variations including but not limited to variations in key, instrumentation, encoding formats, performers, performance conditions, arrangement, and/or recording and processing variations.

At reference numeral 606, the fingerprint, or a part of the fingerprint (e.g., a sub-fingerprint), generated for the audio file is compared against fingerprints, or parts of fingerprints, for reference audio files (known audio files or known songs) (e.g., using the identification component 108). In one implementation, the fingerprint or a part of the fingerprint (e.g., a sub-fingerprint) is used to lookup reference audio files (e.g., using the identification component 108). For instance, the fingerprint can include a set of hash values, and the hash values can be used to lookup a reference audio file using a hash table.

At reference numeral 608, a determination is made whether there are zero or more reference audio files similar to the sample audio file (e.g., using the identification component 108) based on a set of similarity criteria. The similarity criteria can include but is not limited to having a quantity of keys corresponding to a reference audio file. For example, in one embodiment, it may be determined that there are no reference audio files satisfying the set of similarity criteria. As an additional or alternative example, in one embodiment, it may be determined a plurality of reference audio files satisfy the set of similarity criteria. If it is determined that there are one or more similar reference audio files (Y at reference numeral 608), then at reference numeral 610, the similar reference audio files are identified. Returning to reference numeral 608, if it is determined that there are no similar reference audio files (N at reference numeral 608), then the methodology terminates.

FIG. 7 illustrates an example methodology 700 for audio identification using ordinal transformations in accordance with various aspects described in this disclosure. At reference numeral 702, an audio file is obtained, acquired, or otherwise received (e.g., using the media matching component 102). The audio file can include audio data, such as, songs, speeches, and/or soundtracks. For example, the audio file can include a performance of a famous speech or a cover song. At reference numeral 704, a set of vectors of auditory feature values in the audio file are determined at a set of predetermined times and/or predetermined time intervals (e.g., using the vector component 202). For example, in one implementation, a musical octave at a current time interval is divided into a set of bins (e.g., 32 bins), each corresponding to a range of musical pitch (e.g., 1/32 of an octave). A strength of each of the musical pitches (e.g., 32 musical pitches) during the time current interval is computed, and an intervalgram is generated by comparing the pitch vector at the current time interval with pitch vectors at a set of time intervals immediately preceding the current time interval and a set of pitch intervals immediately succeeding the current time interval. For instance, the intervalgram can be generated by comparing the pitch vector at the current time interval with pitch vectors at 16 time intervals immediately before the current time interval and pitch vectors at 16 time intervals immediately after the current time interval. The comparison is a circular cross correlation between pairs of pitch vectors, which yields a 32-dimensional vector (e.g., an interval vector). The resulting 32 interval vectors of 32-dimensions are combined to generate a 32 by 32 intervalgram for the current time interval.

In addition, one or more transformations can be performed on the set of vectors (e.g., using the transformation component 206). For example, in one embodiment, the set of vectors (e.g., intervalgrams, spectrogram, chromagrams, etc.) can be smoothed by averaging a vector included in the set of vectors with a subset of vectors (e.g., 3) preceding the vector. As an additional or alternative example, in one embodiment, an X-dimensional wavelet can be applied to vectors included in the set of vectors, where X is an integer. For instance, a two-dimensional Haar wavelet can be applied to each intervalgram included in a set of intervalgrams for the audio file. Smoothing vectors and/or applying an X-dimensional wavelet basis to vectors produces an output having the same format as the vector (e.g., a 32 by 32 intervalgram).

At reference numeral 706, a set of sub-fingerprints are computed, generated or otherwise determined that include hash values corresponding to respective vectors (e.g., using the hashing component 204). For example, in one implementation, a winner takes all hashing (e.g., using the WTA hash component 208) is applied to each vector (e.g., a intervalgram, spectrogram, chromagram, etc.) to transform the input feature space into binary codes (or hash values) such that a Hamming distance, or Hamming similarity, in a resulting space (e.g., binary codes or hash values) correlates with rank similarity measures (discussed in greater detail with reference to FIG. 5).

At reference numeral 708, a set of keys is generated using the sub-fingerprints (e.g., using the key component 302). For example, in one implementation, the sub-fingerprints are divided into a set of keys based on a set of key generation criteria, which can include but is not limited to a predetermined quantity of keys or a predetermined key size. For instance, a 100-byte sub-fingerprint can be divided into a set of 25 four-byte keys. At reference numeral 710, the respective keys are indexed into hash tables included in a set of hash tables (e.g., using the identification component 108). At reference numeral 712, a determination is made whether there is at least one reference audio files similar to the sample audio file (e.g., using the identification component 108) based on a set of similarity criteria. The similarity criteria can include but is not limited to having a quantity of keys corresponding to a reference audio file. Additionally or alternatively, the similarity criteria can include having a quantity of N sub-fingerprints that match a reference song, where a sub-fingerprint matches a reference song if a set of M consecutive keys match the reference song, where N and M are integers. For instance, N can be a quantity of sub-fingerprints corresponding to a thirty-second interval of the sample audio file. If it is determined that there is at least one similar reference audio file (Y at reference numeral 712), then at reference numeral 714, the at least one similar reference audio file is identified. Returning to reference numeral 712, if it is determined that there are no similar reference audio files (N at reference numeral 712), then the methodology terminates.

FIG. 8 illustrates an example methodology 800 for audio identification using ordinal transformations in accordance with various aspects described in this disclosure. At reference numeral 802, a set of fingerprints for respective reference audio files are obtained, acquired, or otherwise received (e.g., using the identification component 108). Each fingerprint can include a set of sub-fingerprints. At reference numeral 804, a set of reference keys is generated for each fingerprint (e.g., using the reference key component 306). For example, in one implementation, the fingerprints (or sub-fingerprints) are divided into a set of keys based on a set of key generation criteria. As discussed, the key generation criteria can include but is not limited to a predetermined quantity of keys or a predetermined key size.

At reference numeral 806, the reference keys are inserted into corresponding hash table bins in a set of hash tables (e.g., using the reference key component 306). For example, if a first reference song has a key value K for a first hash table, then the first reference song is inserted in bin K in the first hash table. If the first reference song has a key value C for a second hash table, then first reference song is inserted into bin C in the second hash table. The quantity of bins in a hash table is equal to a range of possible values of a key. For instance, for a 32-bit key, there can be 2^32 bins. At reference numeral 808, respective keys for a sample audio file (e.g., audio file 104) are used to lookup reference audio files using the hash tables (e.g., using the identification component 108), and identify any similar reference audio files.

Figure 9:
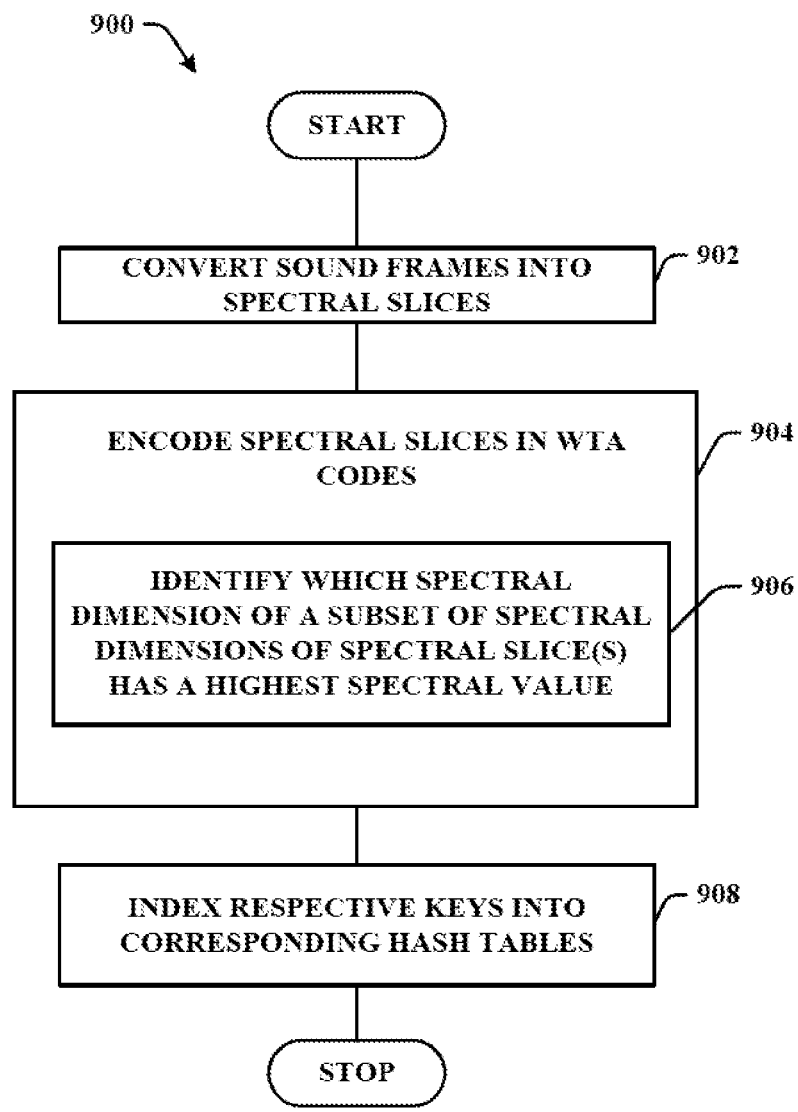

FIG. 9 illustrates an example methodology 900 for sound representation via WTA coding of auditory spectra in accordance with various aspects described in this disclosure. At reference numeral 902, a set of spectral slices are generated from audio content such as sound/audio frames. The audio content or files for respective reference audio files are obtained, acquired, or otherwise received (e.g., using the identification component 108). In one example, spectral slides are generated by stepping along the segments of a sound waveform of a sample audio content (e.g., 50 millisecond long segments with a window stepping every 20 milliseconds), in which each step is called a waveform segment that is to be transformed into a spectrum called a spectral slice. At reference numeral 904, each spectral slice as a feature vector having any number of feature dimensions (e.g., frequency dimensions) is discretized by being converted into a WTA code as a feature vector having any number of feature dimensions (e.g., frequency dimensions).

At reference numeral 906, an identification is performed (e.g., using the identification component 108) to identify which spectral dimension of a subset of spectral dimensions for a spectral slice has a highest value. The identification is based upon the conversion of the spectral slices into the WTA codes or coding of the spectral slices by WTA processes, in which a number (K) dimensions are selected from a spectral slice, and the dimension with the highest value in the subset of size K is coded. For example, K can be selected at random and consistent across all samples, which enables permutations to be generated.

At reference numeral 908, a set of reference keys is generated for the WTA codes (e.g., using the reference key component 306) of the spectral slices. For example, in one implementation, the WTA codes (or sub-fingerprints) are divided into a set of index keys. The reference index keys are inserted into corresponding hash table bins in a set of hash tables (e.g., using the reference key component 306). For example, if a first reference song has a key value K for a first hash table, then the first reference song is inserted in bin K in the first hash table. If the first reference song has a key value C for a second hash table, then first reference song is inserted into bin C in the second hash table. The quantity of bins in a hash table is equal to a range of possible values of an index key. For instance, for a 32-bit key, there can be 2^32 bins. At reference numeral 808, respective keys for a sample audio file (e.g., audio file 104) are used to lookup reference audio files using the hash tables (e.g., using the identification component 108), and identify any similar reference audio files.

Example Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in mechanisms as described for various embodiments of this disclosure.

Figure 10:
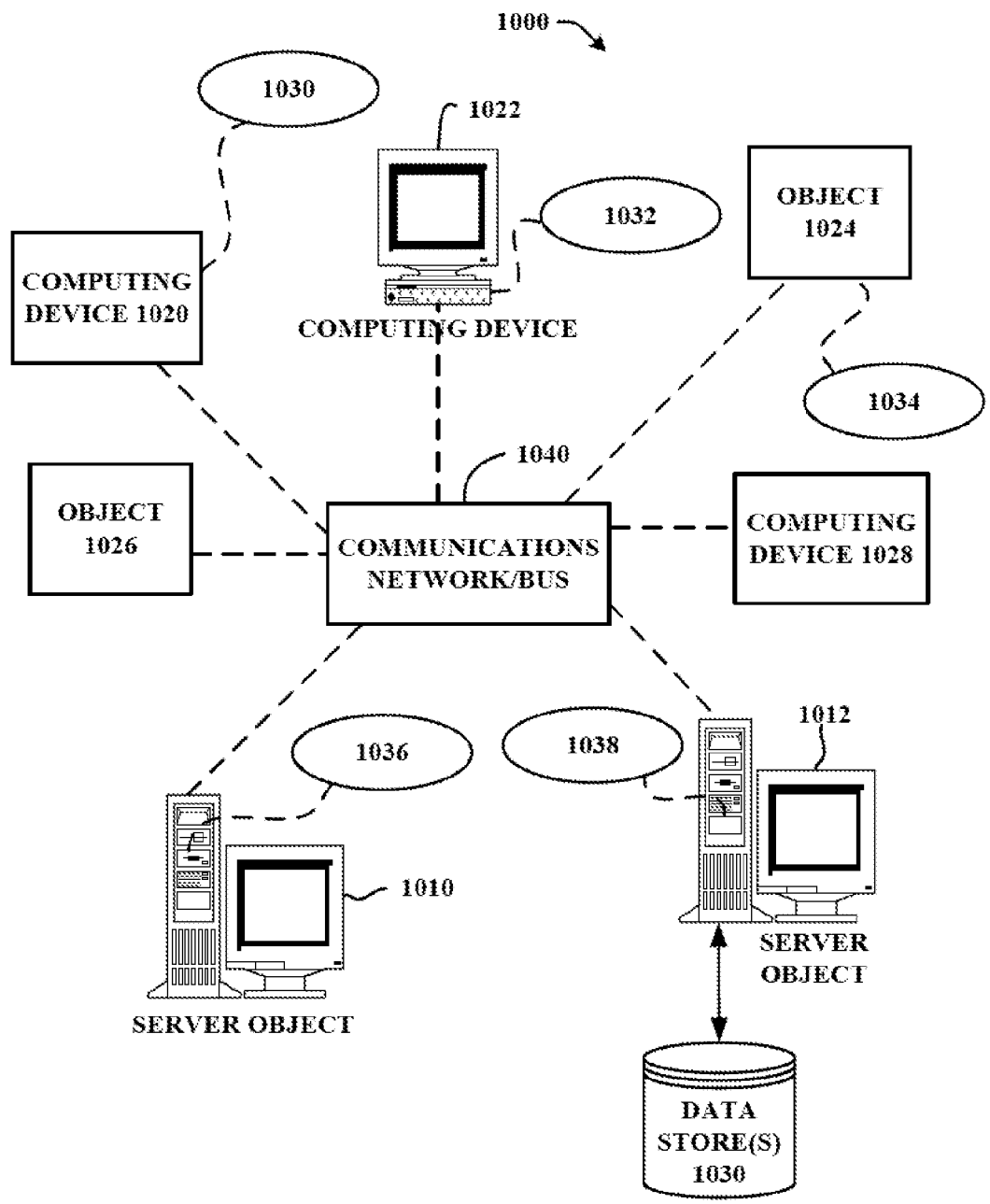
FIG. 10 is a block diagram representing an example non-limiting networked environment in which the various embodiments can be implemented.

FIG. 10 provides a schematic diagram of an example networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that computing objects 1010, 1012, etc. and computing objects or devices 1020, 1022, 1024, 1026, 1028, etc. may comprise different devices, such as personal data assistants (PDAs), audio/video devices, mobile phones, MP3 players, personal computers, tablets, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 1040 is the Internet, for example, the computing objects 1010, 1012, etc. can be Web servers with which the client computing objects or devices 1020, 1022, 1024, 1026, 1028, etc. communicate via any of a number of known protocols, such as the hypertext transfer protocol (HTTP). Objects 1010, 1012, etc. may also serve as client computing objects or devices 1020, 1022, 1024, 1026, 1028, etc., as may be characteristic of a distributed computing environment.

Example Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 11 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 11:
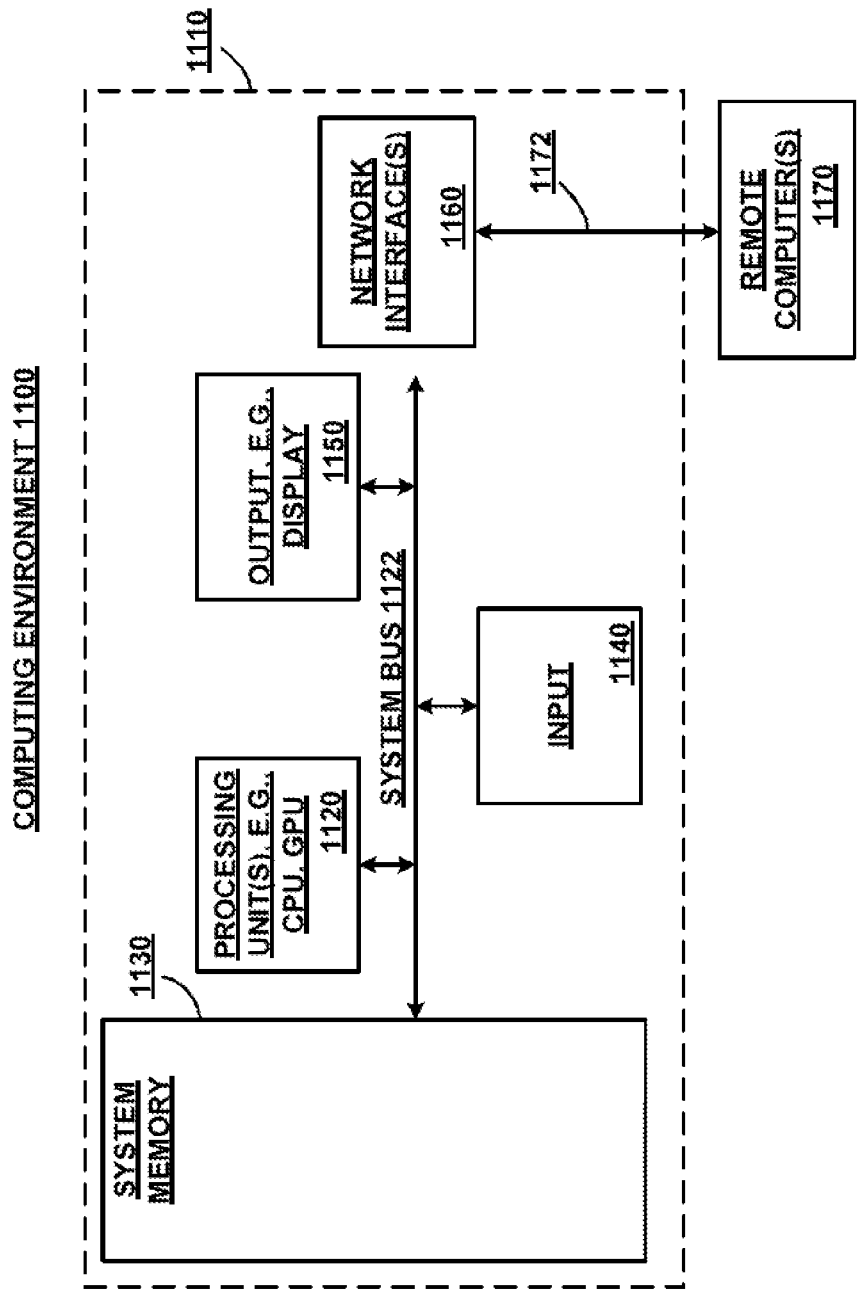
FIG. 11 is a block diagram representing an example non-limiting computing system or operating environment in which the various embodiments may be implemented.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 be interpreted as having any dependency or requirement relating to any one or combination of components illustrated in the example operating environment 1100.

With reference to FIG. 11, an example remote device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120. It is to be appreciated that the computer 1110 can be used in connection with implementing one or more of the systems or components shown and described in connection with the Figures above, such as FIGS. 1-3.

Computer 1110 includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into the computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to publish or consume media in a flexible way.

For the avoidance of doubt, the matter disclosed herein is not limited by the examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium, or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
a memory that stores computer executable components;
a processor that executes the following computer executable components stored in the memory:
an auditory transformation component that converts a set of sound frames from audio content into a set of spectral slices;
a spectral encoder component that encodes the set of spectral slices into winner-take-all codes with a winner-take-all hash function; and
an identification component that identifies which spectral dimension of a subset of spectral dimensions within at least one spectral slice has a highest spectral value according to the winner-take-all codes, that identifies subsets of the spectral dimensions of the at least one spectral slice based on a random function, and that identifies at least one reference audio content that is similar to the audio content based on the winner-take-all codes.

2. The system of claim 1, further comprising a key component that concatenates the winner-take-all codes into index keys.

3. The system of claim 1, comprising a histogram component that histograms the winner-take-all codes into histogrammed winner-take-all codes.

4. The system of claim 1, wherein the winner-take-all codes comprise auditory data based on position of signal peaks.

5. The system of claim 1, comprising an indexing component that indexes index keys based on the winner-take-all codes into a set of hash tables.

6. The system of claim 5, comprising a matching component that identifies the at least one reference audio content that is similar to the audio content based in part on the hash tables.

7. The system of claim 1, wherein the set of spectral slices include stabilized auditory images.

8. A method comprising:
   employing a processor to execute computer executable instructions stored in a memory to perform the following acts:
   converting sound frames into spectral slices from a set of audio content;
   encoding the spectral slices into winner-take-all codes with a winnertake-all hash function;
   identifying which spectral dimension of a subset of spectral dimensions within at least one spectral slice has a highest spectral value according to the winner-take-all codes;
   identifying subsets of the spectral dimensions of the at least one spectral slices based on a random function; and
   identifying at least one reference audio content that is similar to the audio content based on the winner-take-all codes.

9. The method of claim 8, comprising:
   concatenating the winner-take-all codes into index keys.

10. The method of claim 8, further comprising:
    processing the winner-take-all codes into histogrammed winner-take-all codes.

11. The method of claim 8, wherein the winner-take-all codes comprise auditory data based on a position of signal peaks.

12. The method of claim 8, comprising identifying the at least one reference audio content that is similar to the audio content according to hash tables based on the winner-take-all codes.

13. A non-transitory computer readable storage medium comprising computer-executable instructions, that in response to execution, cause a computing system to perform operations, comprising:
    converting sound frames into spectral slices;
    generating winner-take-all codes;
    encoding the spectral slices with the winner-take-all codes to indicate a dimension within a group of a set of groups of spectral dimensions that has a highest spectral value;
    identifying subsets of the spectral dimensions of the at least one spectral slices based on a random function; and
    identifying at least one reference audio content that is similar to the audio content based on the winner-take-all codes.

14. The operations of claim 13, comprising:
    converting the winner-take-all codes into index keys.

15. The operations of claim 14, further comprising:
    processing the winner-take-all codes into histogrammed winner-take-all codes with the index keys.

16. The operations of claim 13, comprising indexing a set of index keys based on the winner-take-all codes into a set of hash tables.

* * * * *